April 10, 1973     H. K. PUHARICH     3,726,762

BLOOD STORAGE METHOD

Original Filed Dec. 26, 1967     4 Sheets-Sheet 1

INVENTOR
HENRY K. PUHARICH

BY
*Mandeville & Schweitzer*

ATTORNEYS

April 10, 1973　　　H. K. PUHARICH　　　3,726,762
BLOOD STORAGE METHOD

Original Filed Dec. 26, 1967　　　　　　　4 Sheets-Sheet 2

INVENTOR
HENRY K. PUHARICH

BY
*Mandeville & Schweitzer*
ATTORNEYS

United States Patent Office 3,726,762
Patented Apr. 10, 1973

3,726,762
BLOOD STORAGE METHOD
Henry K. Puharich, Ossining, N.Y., assignor to Intelectron Corporation, New York, N.Y.
Continuation of abandoned application Ser. No. 693,283, Dec. 26, 1967. This application May 19, 1971, Ser. No. 144,996
Int. Cl. A61k 17/00
U.S. Cl. 195—1.8
2 Claims

ABSTRACT OF THE DISCLOSURE

The present invention is directed principally to the electrodynamic control of blood coagulation and of thrombus formation in natural organs and artificial organ implants, for humans and animals. The invention provides for the net negative electrical charging of the walls of a natural or artificial organ or element of the cardiovascular system, and of the blood cells within such organ or element. The maintenance of such a net negative charge provides for a mutual repulsion of the blood cells from themselves and from the natural or artificial vascular surface, so that clotting and thrombus formation is avoided without utilization of anticoagulant chemical agents, as has been necessary heretofore with implanted artificial elements, for example. The invention also is useful in the elimination of existing thrombus formations, and is indicated to have a variety of advantageous observed and subjectively reported therapeutic results, presumably derived from "cleansing" of the cardiovascular system. A feature of the invention is the manner and means for effecting the desired net negative charge. The invention is indicated to have utility in the treatment of humans and animals. It also has indicated usefulness in the preservation of blood in storage.

---

This application is a continuation of Ser. No. 693,283, filed Dec. 26, 1967, now abandoned.

BACKGROUND OF INVENTION

It has been previously indicated that maintenance of a 0.4 volt negative potential (referenced to the hydrogen electrode, $E_{h0}$ at pH 7.0 at 25° C.) between blood and its containing wall prevents clotting and thrombus formation. Conversely, if the potential falls below 0.4 volt negative, or goes positive in sign, blood coagulation and thrombus formation tend to occur.

It is known that, in a healthy cardiovascular system, blood cells normally carry net negative electrical charges, and the interior surfaces (endothelia) of blood vessels also normally carry net negative charges. Accordingly, electrical repulsion forces normally keep blood cells from coagulating or depositing on vascular endothelium, thereby preventing thrombus formation.

In the event of a breakdown of normal body functions, such as to result in a loss or partial loss of the necessary net negative charges, and perhaps because of other complex reasons, undesirable coagulation and thrombus formations (i.e., thrombin and/or fibrin deposits) may occur in the human body. Moreover, in connection with the implantation or temporary utilization of artificial organs or elements of the cardiovascular system, extensive experience with humans and animals has established that there is a significant tendency for thrombus formation to occur on the walls of the artificial element. In order to avoid the rapid closing off of the blood passages in such an artificial organ, or in appropriate cases to minimize thrombus formation in an unhealthy natural cardiovascular system, it has been customary to utilize anticoagulant chemical agents. These agents are not entirely satisfactory, however, because the normal coagulating property of the blood is an important characteristic and a general overall reduction in coagulating ability may lead to dangerous bleeding conditions elsewhere in the body. This is particularly undesirable where, as is the case with the utilization of an artificial organ or element, the tendency for coagulation or thrombus formation is a strictly local condition. In such cases, it is far superior to counteract a local condition with a local therapeutic effect.

SUMMARY OF INVENTION

It is a function of the method and means of the invention to simulate the natural, electrically repelling condition of the blood cells and vessels, both in artificial organ implants, and in normal and abnormal blood vessels. Thus, the invention is in part directed to a method for electrical charging of certain natural and/or artificial materials associated with the body of a human or animal subject in order to maintain the desired electrical potential which prevents thrombus formation in natural or artificial organs or elements of the cardiovascular system. The invention is also directed in part to means used to maintain the desired electrical charges.

A significant aspect of the invention resides in the provision of a method and means for effecting electrical energization of blood and its containing vessel in such a way that there is imparted to the individual blood cells a net negative charge, which causes the cells to mutually repel, and there is also imparted to the wall of the vessel a net negative surface charge, which causes the negatively charged blood cells to be repelled from the vessel wall. When this is accomplished, coagulation of the blood is prevented by the mutual repelling action in the cells and thrombus formation is prevented by repelling of the cells by the vessel wall.

In the body of a human or animal subject, the desired electrical charging of the blood cells and vessels is effected by imparting to the body an alternating current electrical signal, which is of a character such as to desirably affect the blood vessels of the body. Where the electrical stimulation of the body is effected by an external circuit, coupled with the skin of the subject, the electrical stimulation ideally is achieved with a relatively high frequency (20–40 kHz.), amplitude modulated carrier signal. This is advantageously applied through a signal generating circuit capacitatively coupled with the body of the subject, and having sufficient inductance incorporated in the circuit to be able to be in substantial circuit resonance with the body for the carrier frequency signal employed. For therapeutic treatment of living subjects, the carrier signal advantageously is audio modulated within a frequency band with of around 20 to 2,000 kHz. and this modulated signal is advantageously amplitude modulated in a generally triangular envelope.

Where the subject has been fitted with an external artificial organ or element, the energizing circuit may be coupled directly with the artificial organ or element, particularly as in the instance of the temporary utilization of an artificial heart, which is located externally of the subject. Where the artificial organ or element is implanted, the local energization thereof may be effected through the use of an implanted radio receiver, which is activated by and responds to the capacitatively coupled generating circuit and applies its output directly to the implanted organ or element.

In accordance with a further aspect of the invention, whole blood extracted for storage and subsequent use, can be maintained in a useable condition for significantly increased periods of time by initially placing the blood in a vessel capable of retaining a negative charge on its inner wall when subjected to an AC energization, and then maintaining the stored blood under the necessary energization during the storage period.

For a more complete understanding of the invention, reference should be made to the following detailed description and to the accompanying drawings.

One of the significant, underlying principles, on which the present invention is based is the knowledge, previously established, that a negative electrical charge on blood cells and on the wall of the blood-containing vessel will, if maintained at an adequate level, prevent or at least significantly inhibit coagulation and thrombus formation. The significant advance of the present invention resides in the establishment of a procedure and a means by which such electrical charge relationship may be achieved in a live human or animal subject, not only with natural organs and elements, but also in conjunction with the use of artificial organs and elements.

In accordance with the invention, an alternating current electrical signal is imparted to a blood-containing vessel, at least the inner surface characteristics of which are such as to be unidirectionally charged by the alternating current signal to the desired negative voltage level. The blood cells also assume a desired negative charge, such that the desired repelling forces are established, as above described. Fortuitously, the endothelia of the natural blood vessels (which normally carry a net negative charge in the natural, healthy state) are of a character to assume a negative charge upon energization by an alternating current signal. However, where artificial organs and elements are utilized, it is important to utilize materials which will assume the desired net negative surface charge of approximately 0.4 volt or greater, in the presence of biological fluids such as blood. A wide variety of materials may be selected for this purpose, and relatively simple experimentation will establish the charge acceptance characteristics of a given material. Among the materials found to be suitable from a charge acceptance standpoint are a metal, titanium, semi-conducting material, silicon, and a dielectric material, cellulose nitrate. Cellulose nitrate was found to be a particularly desirable all-around material. On the other hand, certain common materials, which have a positive charge acceptability are entirely undesirable for the purposes of the invention. Surprisingly, glass, which has been extensively used for the storage of blood, for example, is one of these unacceptable materials.

Figure 1:
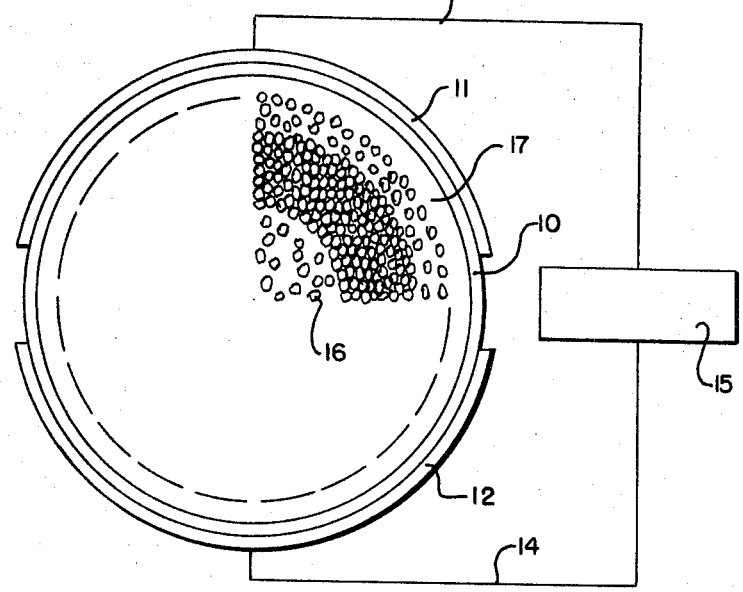
FIGS. 1 and 2 are simplified representative cross sectional views of a blood-containing vessel, constituted and energized in accordance with the invention, to illustrate the effect thereof on the contained blood.
Figure 2:
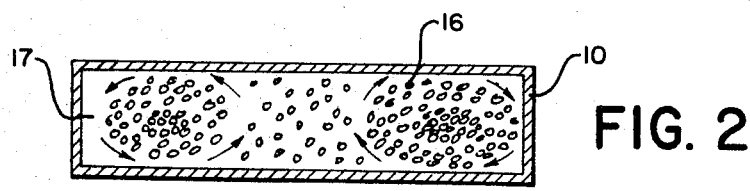

By way of illustrating the basic principles of the invention, reference may be had to FIGS. 1-4. In FIGS. 1 and 2 there is illustrated a closed vessel 10 of cylindrical cross-section, in which is retained a quantity of whole blood. The cylindrical cross-section of the vessel 10 is somewhat representative of the cross-section of a natural blood vessel, for example. In the illustration, the vessel 10 is formed of a material, such as cellulose nitrate, having a desired level of negative charge acceptance when energized by an alternating current signal.

As shown in FIG. 1, a pair of electrodes 11 and 12 are placed in contact with opposed surface areas of the cylindrical side wall of the vessel 10, and these electrodes are connected through suitable conductors 13, 14 to a signal generating source 15.

When an alternating current signal is impressed upon the cellulose nitrate vessel 10, sufficient to establish a net negative surface charge of at least 0.4 volt, typically accompanied by a charge on the individual blood cells 16 of on the order of $2.0 \times 10^8$ coulombs per cell, the blood cells are observed immediately to be activated. In a cylindrical vessel of the indicated proportions, the blood cells begin streaming in a generally toroidal motion. Thus activated, the blood cells remain in suspension for many hours without sedimentation or clotting.

As is clearly indicated in FIGS. 1 and 2, a barrier zone 17 is formed in the vessel 10, between the negatively charged inner wall surfaces and the blood cells, such that the walls of the vessel remain entirely free of blood cells and thrombi.

Chambers constructed utilizing sections of animal arteries and veins, placed in the electrical field substantially as indicated in FIGS. 1 and 2, show the same effects as just described for the cellulose nitrate vessel 10.

Figure 3:
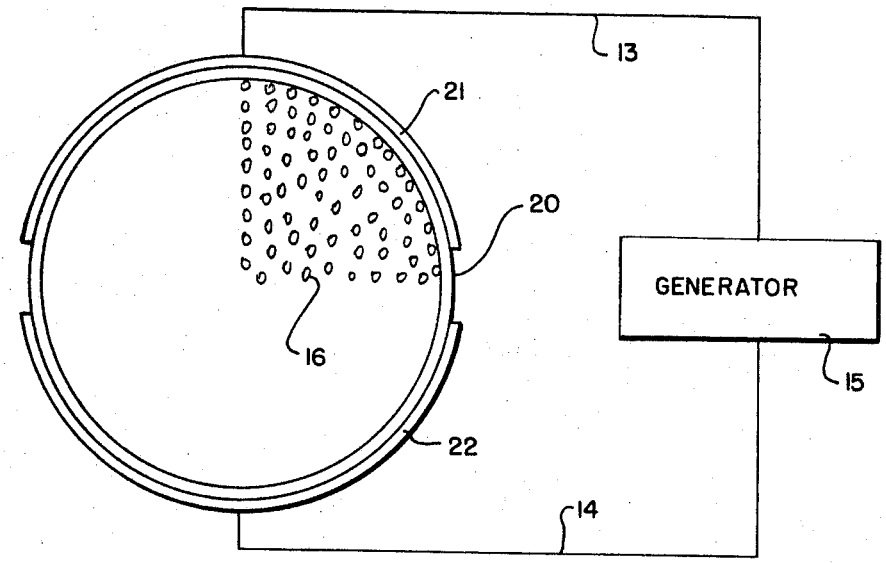
FIGS. 3 and 4 are simplified representative cross sectional views of a blood-containing vessel physically similar to that of FIGS. 1 and 2 and similarly energized, but constituted of a material not suitable for the purposes of the invention, illustrating the effect thereof on the contained blood.
Figure 4:
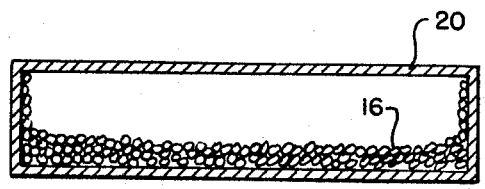

In contrast to the above, repeating the procedure outlined in connection with the cellulose nitrate 10 of FIGS. 1 and 2, but using a vessel 20 formed of glass, as shown in FIGS. 3 and 4, none of the desirable effects of the invention were achieved. Notwithstanding the maintenance of a similar alternating current energization through electrodes 21–22, placed on the surface of the glass, the blood cells remained stationary in the suspending fluid and tended to deposit on the glass walls of the vessel. Typically, the blood cells will sediment out of the fluid in about thirty minutes, in spite of continuous alternating current electrical charging.

Figure 6:
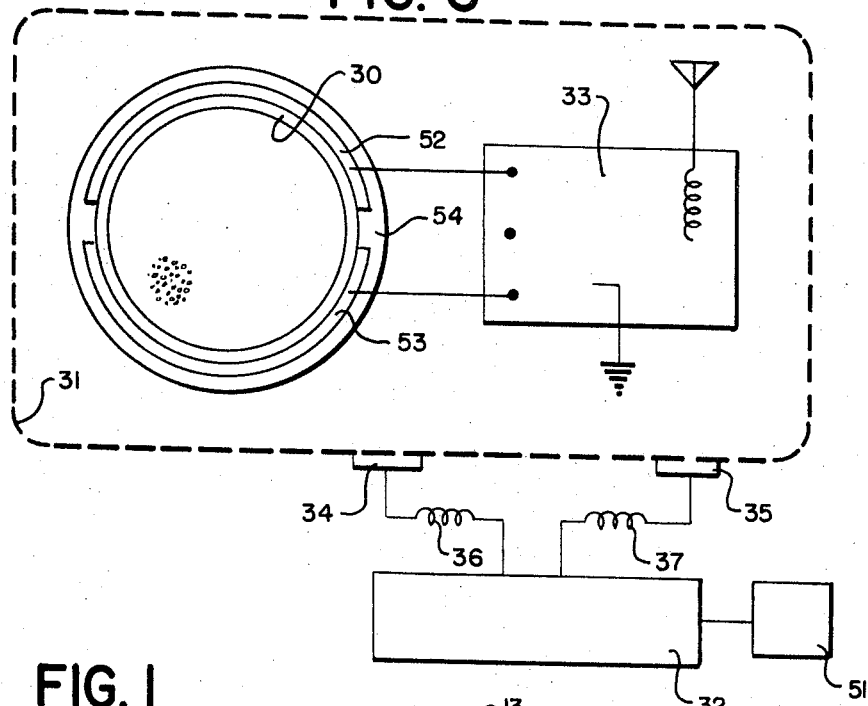
FIG. 6 is a greatly simplified representation of the circuit arrangement of FIG. 5.
Figure 5:
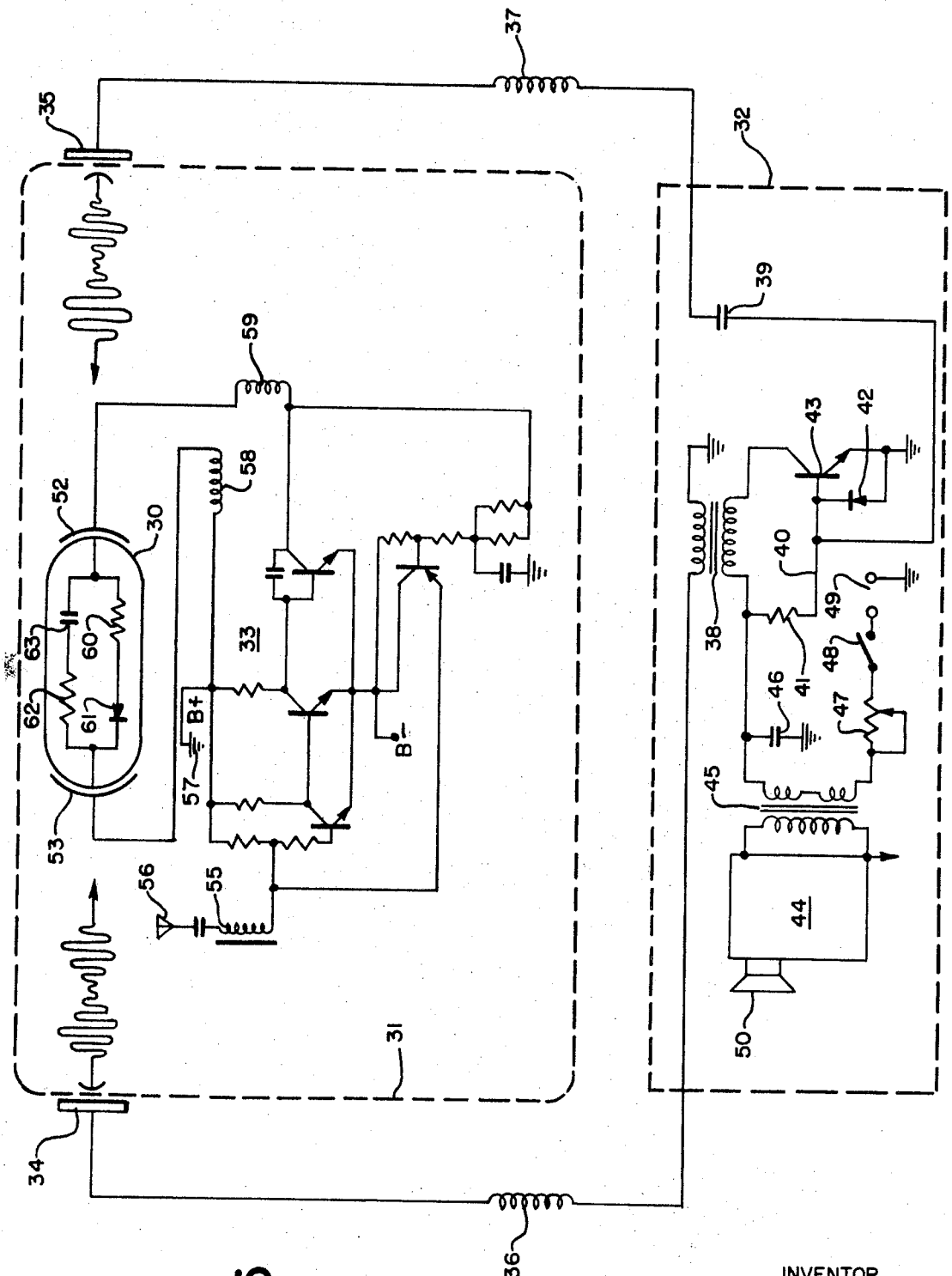
FIG. 5 is a schematic representation of an advantageous form of energizing circuit, for use in practicing the invention in connection with the treatment of human and animal subjects.

Referring now more particularly to FIGS. 5 and 6, illustrating a specific system in accordance with the invention for electrically energizing an implanted organ or element 30, within the body 31 of a human or animal subject, the system is shown to comprise a primary energizing unit 32 and a secondary energizing unit 33. The primary energizing unit 32 is located externally of the body and, where the organ or element to be energized is located outside of the body (as with a temporary prosthetic) or in a suitable location within the body, it may be sufficient to utilize only the primary energizer 32. In other cases, as where the component 30 is an implanted artificial heart, for example, it may also be necessary to utilize the secondary energizer 33, which is essentially a broad band receiver-amplifier of the signals imparted by the primary energizer 32.

The energizing system 32 incorporates certain of the advantageous features described in a copending application Ser. No. 633,035, filed Apr. 24, 1967, by Henry K. Puharich and Joseph L. Lawrence, and also certain advantageous features described in an earlier application Ser. No. 446,267, filed Apr. 7, 1965, by the same inventors. Reference to these applications may be made for further details.

The output of the primary energizing system 32 includes a pair of electrodes 34, 35, which are capacitatively coupled with the body of the subject. Typically, the electrodes 34, 35 are covered with a dielectric material and are placed against the skin of the subject. In series with the capacitative electrodes 34, 35 are large inductances 36, 37, advantageously in the range of 2 to 70 millihenries and being adjustable within that range for the accommodation of a wide variety of subjects. One of the inductances 36 is connected through the secondary of a transformer 38 to ground. The other instance 37 is connected through a capacitor of about 0.01 microfarad 39 to a point on a conductor 40 joining one side of a 220K ohm resistor 41, the positive terminal of a diode 42 and the base of a transistor 43, suitable a 2N3053. The emitter of the transistor and the negative terminal of the diode are connected to ground. The collector of the transistor and the other terminal of the resistor 41 are connected to opposite terminals of the primary transformer 38. This circuit, once energized and periodically pulsed, will oscillate at a frequency, herein referred to as the carrier frequency, which is substantially in a circuit resonant relation with the body of the subject, for maximum effectiveness of the power input, as described in more detail in the above mentioned copending applications.

Desirably, the inductances 36, 37 are selected, with respect to a given subject, to provide a carrier signal at a frequency on the order of about 20 kHz. to about 40 kHz. By so designing and constructing the circuit that the inductances 36, 37 are the primary determinants of resonant frequency, in relation to the capacitance of the coupled electrodes 34, 35, the resonant frequency may be kept rather constant notwithstanding momentary changes in circuit capacitance due to physiological and other changes in the body of the subject.

Amplitude modulation of the carrier signal is derived from a modulating source, generally designated by the numeral 44, the output of which is the primary of a transformer 45. One terminal of the transformer secondary is connected to the oscillating circuit, and also is connected through a 0.01 microfarad capacitor 46 to ground. The other terminal of the secondary is connected through a power level potentiometer 47 and a power switch 48 to a suitable power source 49, typically of about 8 volts.

In one advantageous form of the invention, the input to the modulating source 44 is a microphone 50, which may be positioned to monitor the heart beat of the subject. This provides an especially desirable form of modulation of the carrier signal, because it is synchronized with heart activity. Where it is not feasible to monitor the heart beat of the subject, or in instances of blood storage or the like which does not involve the presence of a live subject, the carrier signal modulation may be imparted by means of a programmed signal generator, as generally designated by the reference numeral 51 in FIG. 5. The programmed generator 51 is adapted to impart a selected modulating frequency in an overall band width of from about 20 to about 2,000 Hz. The amplitude of the modulating signal is varied in cycles of about one second, from about 10% to about 80% modulation. The modulating frequency can be cyclically varied also, if desired.

In the typical arrangement illustrated in FIGS. 5 and 6, in which the external energizing system is coupled to the body of the subject with a capacitance of from about 0.1 to about 0.2 microfarad, the desired voltage level across the electrodes is on the order of 4 to 8 volts (about 6 to 10, peak to peak), which results in an applied current on the order of 2 to 4 milliamperes (RMS).

Where the organ or element to be energized is so disposed within the body 31 as to make desirable the use of the implanted receiver-amplifier 33, the system is arranged so that the modulated carrier signal, imparted to the body through the coupling electrodes 34, 35, is amplified by the receiver 33 and imparted thereby to electrodes 52, 53 placed on opposite sides of the implanted organ or vessel 30. A suitable insulating material 54 is provided about the electrodes and the organ or element 30, in order to isolate the energized region from the remainder of the body.

The implanted receiver-amplifier 33 advantageously includes a ferrite coil antenna 55, the high end of which is placed in contact with the interior tissues of the body, as at 56. The "B+" terminal of the receiver, designated by the numeral 57, is also grounded to the body tissues, in a body region spaced from the antenna 55.

Energization of the receiver-amplifier 33 is controlled by the power potentiometer 47 of the transmitter unit 32 at a level such that at least a minimum bias voltage is imposed to activate the receiver. At or above such minimum operating levels, typically about 1.4 volts bias voltage, the receiver amplifies the modulated carrier signal and imparts it to the organ or element 30. The output circuit of the receiver 33 is arranged to be in L-C series resonance by proper selection of output circuit inductances 58, 59 with reference to the capacitance of the electrode couplings 52, 53 to the implanted element or organ 30.

For explanatory reference only, the organ or element 30 and its contained blood may be considered to have equivalent circuit characteristics somewhat as represented in FIG. 5. In the hypothesized equivalent circuit representation, a 4.7K ohm resistor 60, in series with a diode 61, is connected in parallel with a 220 ohm resistor 62, in series with a 0.2 microfarad capacitor 63. While I do not wish to be bound in any way by this suggested equivalent circuit, it does appear to approximate the actual characteristics of a blood-filled organ or vessel energized in accordance with the invention.

Using a system and method according to the invention, a series of controlled experiments was conducted at New York University Medical Center, New York City, by the Cardiovascular Experimental Surgery Team, of the Department of Surgery. In a first series, prosthetic tubes formed of cellulose nitrate were inserted in the inferior vena cava of several dogs, but without electrical energization according to the invention. No anticoagulant chemicals were utilized. It was found that the prosthetic tubes clotted up within a period of about one hour.

In a similar series of experiments, in which the prosthetic tubes were energized by a high frequency carrier signal modulated in the desired manner previously indicated, the prosthetic tubes remained free of clotting and thrombus formations all day, until the experiments were terminated. The extent of the experiments indicated that the freedom from clotting and thrombus formation could have been continued indefinitely. In another series of experiments performed under the auspices and by the medical team indicated above, an artificial left ventricle assist pump was inserted in the left ventricle of the heart of a dog, arranged to bypass the normal functions of the heart. The implanted assist pump was provided with an interior lining of cellulose nitrate lacquer and electrodes. No anticoagulant chemicals were administered to the dog and no electrical stimulation was provided. Within a period of about three minutes the implanted assist pump had clotted up solid and was unable to function. A second experiment, similar to the first except that the assist pump was energized (directly from a signal generator) by a modulated carrier signal as before described. The experiment was continued for one hour and then terminated by intent. All cardiovascular dynamics of the dog were normal during and at the end of the one hour period. After termination of the experiment, the interior surfaces of the pump were inspected and found to be perfectly clear. The time extent of the experiment was deemed sufficient to indicate that the implanted organ could have been kept free of clots and thrombus formation for an indefinite period.

In additional experiments, it has been shown that existing thrombi can be dissolved safely within a few hours by energizing the organ or vessel in which a thrombus formation has developed, in accordance with the teachings of the invention as hereinbefore stated. In part, this may result from the fact that further thrombus formation in affected area is prevented, accommodating dissolution of the existing thrombus by natural body actions. In addition, it has been established that the audio frequency modulating envelope of the high frequency carrier signal induces piezoelectric vibrations in the blood cells and blood fluid which often can be audibly detected. This vibratory action may assist in the natural dissolution of thrombus formations and otherwise tend to free the vessel of biological "debris."

According to recognized current medical practice, cardiovascular techniques successfully applied to dogs is expected to be applicable to human subjects. This tends to be borne out in the present instance by experimental evidence developed using cross sectional samples of human blood vessels.

Because of the ability of the new procedure to effect dissolution of existing clots and thrombus formations, advantageous therapeutic effects can be achieved through the treatment of non-operative patients suffering from impairment of the cardiovascular system through the accumulation of deposits. Perhaps also the piezoelectric stimulation of the blood vessels brings about a desirable result. For such patients, a course of treatment, involving periodic energization and stimulation of areas of the cardiovascular system, may be particularly desirable.

There are diseased conditions in humans, as for example those associated with diabetes, where peripheral arteriolar circulation becomes impaired, with consequent sludging of blood, blood sedimentation, blood cell adhesion to vascular walls, and eventually thrombus formation and blockage of circulation. The periodic treatment of such patients, as by application of the electrodes 34, 35 (FIG. 5) to selected areas with appropriately programmed energization, can prevent or significantly mitigate the undesirable and dangerous clinical effects.

There are also conditions in humans, in which the central nervous system shows degenerative changes due to poor blood circulation. A typical example of such a condition is found in old age, with associated symptoms of senility. Experiments have been carried out with human patients showing such symptoms of senility as emotional instability, irritability, loss of memory for recent events, temporal and spacial disorientation, instability of balance, and various confusional mental states. Such patients, after two to four weeks of programmed treatment (as described in copending application Ser. No. 633,035) show remarkable improvement in those symptoms outlined for senility. It is believed that such therapeutic effects are the result of improved blood circulation and an improvement in the structural condition of blood vessels, brought about by the restoration of the normal negative charge relationships on blood cells and endothelia of the blood vessels.

In post-operative patients, there is always a significant risk of post-operative thrombus formation in some parts of the venous system. In such cases, the breaking off of a portion of a thrombus formation, and its release into the vascular system, can endanger life if the emboli block an artery vital to an organism such as the lungs, brain or heart. Accordingly, the procedure of the invention may be utilized to advantage as part of a post-operative series of treatments. In such treatments, energization by the primary energizing unit 32 would typically be applied to known danger areas, such as leg veins, to prevent thrombus formations therein and/or to accommodate safe dissolution of existing thrombi.

One of the commonest causes of death is the sudden formation of a blood clot in an artery supplying a vital organ. In patients where there is any advance medical indication that such a catastrophic event is probable or likely, electrical stimulation of the suspected vascular system in accordance with the invention can serve as an effective preventative measure.

Figure 7:
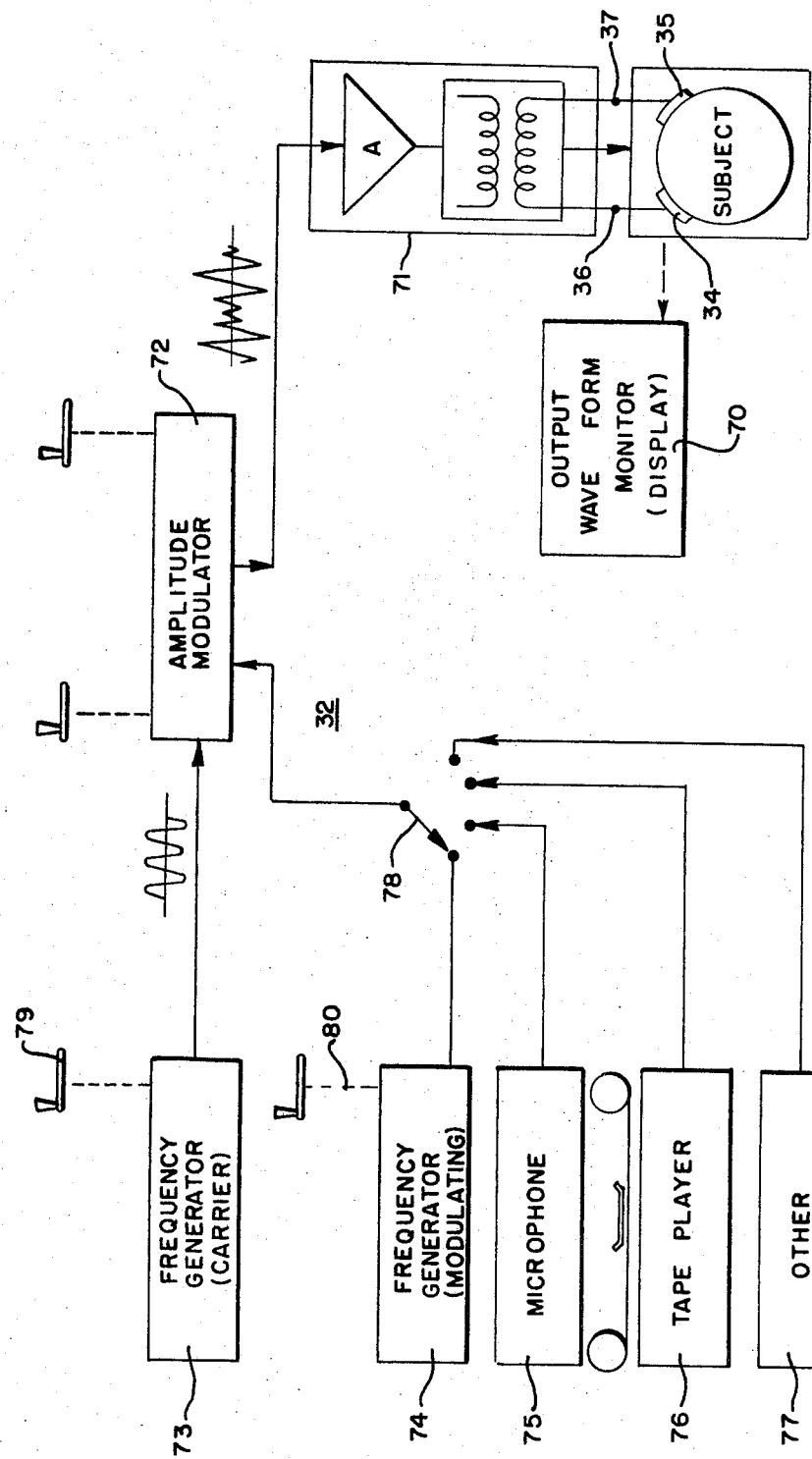
FIG. 7 is a simplified, representative illustration of a desirable form of clinical apparatus useful in carrying out treatments in accordance with the invention.

For any of the circumstances involving the periodic treatment of subjects, it may be advantageous to utilize a clinical treatment apparatus, such as is shown diagrammatically in FIG. 7. In the FIG. 7 arrangement, there is provided a primary energizing unit 32 having provision for interchangeably adjustable series inductances 36, 37 and coupling electrodes 34, 35 adapted for application on the subject, at areas selected by the physician. Desirably, a display monitor 70 is provided, enabling the treating physician to ascertain the precise form of energization being imparted to the subject.

In the illustration of FIG. 7, the primary energizer unit 32 includes an output amplifier section 71 fed by an amplitude modulating control section 72. The inputs to the amplitude modulator 72 are a carrier frequency generator 73, on the one hand, and a plurality of selectively utilizable modulating inputs 74-77, on the other hand. The modulating inputs are used one at a time, according to the setting of a selector switch 78.

As indicated, the carrier frequency generator 73 is provided with an adjustment 79 for regulation of the carrier signal frequency, desirably within the optimum range of 20 to 40 kHz. The modulating frequency generator 74 likewise is provided with an adjustment facility 80, desirably for regulating the modulating frequency between about 20 to about 2,000 Hz. The microphone input 75 may be utilized to monitor body functions of the subject (such as heart beat) and to provide modulation in accordance therewith.

The modulator input 76 is a tape deck, which may be programmed to provide a variety of complex sequences of modulation, as may be determined to be desirable for a given patient and/or a given condition, for example.

In all of its various specific applications, whether in conjunction with the implantation or temporary external utilization of artificial organs and elements or in conjunction with a course of therapeutic treatments for post-operative and/or non-operative patients, the procedure of the invention is based upon the concept of imparting a negative charge of an effective level to the blood cells and to the walls of the containing vessel, whether it be natural or artificial. A particularly significant aspect of the invention resides in the realization that an alternating current energizing source is required in order to achieve the necessary net negative charges on the blood cells and containing vessel walls. Through extensive experimentation, it has been established that an audio frequency, amplitude modulated high frequency carrier signal is most ideally suited for achieving the results sought for by the process of the invention, although it is not indicated that all other forms of alternating current electrical energization are inoperative, and I therefore do not necessarily limit the scope of claims to energization in the specific manner described. It is to be borne in mind, however, that, when dealing with the human body in particular, it is especially desirable to maintain current, voltage and the power inputs at the lowest practicable level, and the specific mode of energization herein described appears to be optimum for this purpose.

A further significant aspect of the invention resides in the recognition that, in connection with the use of an artificial element or organ to be incorporated in the cardiovascular system, the material thereof be selected to be of a kind which will accept a negative charge when exposed to an alternating current electrical field. This enables the artificial prosthetic to behave in a manner similar to the natural blood vessel endothelium.

The extraordinary ability of the processing system of the invention to prevent clotting and thrombus formation when using artificial elements or organs can be especially significant in connection with the use of external kidney dialysis machines, heart-lung machines, and the like. In this respect, while clotting and thrombus formation presently can be minimized through the use of anticoagulant chemicals injected into the blood stream, these chemicals affect the blood system as a whole and can result in dangerous bleeding or other undesirable conditions in other portions of the body. In contrast, the effect of the electrical stimulation in accordance with the invention can be localized in the area in which it is needed (in and about the prosthetic). Moreover, experience to date indicates that vascular energization in accordance with the invention is incapable of causing bleeding conditions elsewhere in the body, as can occur through improper use of anticoagulant chemicals or in people otherwise having a susceptibility to hemophilia, for example.

The invention is also useful to advantage where it is desired to reduce the coagulation rate of a contained body of blood. Thus, the procedure of the invention has increased coagulation time by in vitro tests, by a factor of three to four times. This compares more or less equivalently to the increase derived from the use of anticoagulant chemicals, but of course does not involve the inherent dangers associated with such chemicals.

An especially significant utilization of the principles of the invention is realized in connection with the storage of whole blood. Conventionally, whole blood stored under the best of conditions has a shelf life of approximately 26 days, and enormous quantities of such stored blood must be discarded because of deterioration. In accordance with the present invention, by storing whole blood in vessels formed of a material suitable for accepting a negative charge, and maintaining a continuous alternating current electrical charge as herein described, the shelf life of the whole blood can be doubled. This can greatly increase the effective supply of stored whole blood by reducing losses through deterioration.

Depending upon the specific application intended, the signal generator may be coupled to the organ or element to be energized in a variety of ways, within the purview of the invention. Where, for example, the organ or element is a temporary prosthetic, located externally of the body or directly accessible within the body, the electrodes 34, 35 may be directly coupled to the prosthetic. In certain other cases, involving a natural or possibly even a prosthetic organ or element which is embedded within the body, it is practicable to couple the electrodes to the skin of the subject and rely upon the transmission characteristics of the surrounding body tissue and fluids to effect the desired energization of the organ or element. In still other cases, a broad band receiver-amplifier is implanted within the body and its output electrodes are coupled to the organ or element to be energized. The electrodes 34, 35 of the primary energizer are coupled to the body of the subject but are operative to activate the receiver-amplifier, rather than the organ or element directly. The receiver-amplifier is designed to reproduce the inputs of the primary energizer and apply a corresponding energization to the desired organ or element.

In all of its forms, the method and apparatus of the invention is operative to establish a desired level of negative charge on blood cells and on the containing walls therefor, with both natural and artificial blood containment vessels. The result is to effect a mutual repelling action which prevents or significantly inhibits clotting and thrombus formation.

It should be understood that the specific forms of the invention herein illustrated are intended to be representative only, as certain changes may be made without departing from the clear teachings of the disclosure. Accordingly, reference should be made to the following appended claims in determining the full scope of the invention.

I claim:
1. The method of storing blood, which comprises
  (a) placing the blood in a closed storage container whose inner wall surfaces, at least, are formed of a material capable of developing and retaining a negative electrical charge at the blood/wall interface when energized by an alternating current signal, and
  (b) energizing the closed container and the contained blood by an alternating current electrical signal and establishing an alternating current electrical field thereacross, whereby to charge the cells of the blood and the entire inner wall surfaces of the container with a negative charge sufficient to cause mutual repelling of the cells and repelling of the cells from all the inner surfaces of the container.
2. The method of activating blood within a closed container capable of accepting a negative charge when energized by an alternating current source, which comprises
  (a) establishing an alternating current field of predetermined characteristics across said walls to develop a negative charge at the entire blood/wall interface;
  (b) said alternating current field being of a frequency in excess of about 20 kHz., which is amplitude modulated between 10 and 80% modulation by an audio frequency signal;
  (c) the cycle of amplitude modulation from between 10 and 80% being of a generally triangular envelope having a cycle on the order of one second.

References Cited
UNITED STATES PATENTS
3,503,850  3/1970  Dibelius _____ 23—258.5

OTHER REFERENCES
Mirkovitch, Cleveland Clinic Quarterly, vol. 30, pp. 241–252, October 1963.

RICHARD L. HUFF, Primary Examiner

U.S. Cl. X.R.
128—422; 317—3